United States Patent
Miki

(10) Patent No.: US 10,483,530 B2
(45) Date of Patent: Nov. 19, 2019

(54) CATHODE ACTIVE MATERIAL AND FLUORIDE ION BATTERY

(71) Applicant: TOYOTA JIDOSHA KABUSHIKI KAISHA, Toyota-shi, Aichi-ken (JP)

(72) Inventor: Hidenori Miki, Hiratsuka (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 16/157,778

(22) Filed: Oct. 11, 2018

(65) Prior Publication Data

US 2019/0123345 A1 Apr. 25, 2019

(51) Int. Cl.
H01M 4/36 (2006.01)
H01M 4/58 (2010.01)
H01M 10/0566 (2010.01)
H01M 4/02 (2006.01)

(52) U.S. Cl.
CPC ....... *H01M 4/364* (2013.01); *H01M 10/0566* (2013.01); *H01M 2004/027* (2013.01)

(58) Field of Classification Search
None
See application file for complete search history.

(56) References Cited

U.S. PATENT DOCUMENTS

2008/0102373 A1  5/2008  Potanin

FOREIGN PATENT DOCUMENTS

| JP | 2008-537312 A | 9/2008 |
| JP | 5615497 B2 | 10/2014 |
| JP | 2017-010865 A | 1/2017 |
| WO | 2007/146453 A2 | 12/2007 |

OTHER PUBLICATIONS

M. Anji Reddy et al., "Batteries based on fluoride shuttle", Journal of Materials Chemistry, 2011, 4 pgs., vol. 21.

*Primary Examiner* — Yoshitoshi Takeuchi
(74) *Attorney, Agent, or Firm* — Sughrue Mion, PLLC

(57) ABSTRACT

A main object of the present disclosure is to provide a cathode active material that is used in a fluoride ion battery and is capable of being charged and discharged at a high potential. The present disclosure achieves the object by providing a cathode active material used in a fluoride ion battery, the cathode active material comprising: a Ce element, a S element, and a F element; and
a composition represented by CeSF.

4 Claims, 3 Drawing Sheets

CATHODE ACTIVE MATERIAL AND FLUORIDE ION BATTERY

TECHNICAL FIELD

The present disclosure relates to a cathode active material that is used in a fluoride ion battery and is capable of being charged and discharged at a high potential.

BACKGROUND ART

As high-voltage and high-energy density batteries, for example, Li ion batteries are known. The Li ion battery is a cation-based battery utilizing Li ions as the carrier. Meanwhile, as anion-based batteries, fluoride ion batteries utilizing fluoride ions as the carrier are known.

For example, Patent Literature 1 discloses that $CeF_x$ is used as a cathode active material in a fluoride ion battery. Also, Patent Literature 2 discloses that $CuF$, $CuF_2$, $PbF_2$, and $PbF_4$ are used as a cathode active material in a fluoride ion battery. Also, Patent Literature 3 discloses that a metal fluoride represented by composition formula: $MF_x$ (provided that, M represents a metal, and X represents the valence of the metal M), as a cathode active material in a fluoride ion battery. Also, Non-Patent Literature 1 discloses that $CuF_2$ is used as a cathode active material in a fluoride ion battery.

CITATION LIST

Patent Literatures

Patent Literature 1: Japanese Patent (JP-B) No. 5615497
Patent Literature 2: Japanese Patent Application Publication (JP-A) No. 2008-537312
Patent Literature 3: JP-A No. 2017-010865

Non-Patent Literature

Non-Patent Literature 1: M. Anji Reddy et al., "Batteries based on fluoride shuttle", J. Mater. Chem., 2011, 21. 17059-17062

SUMMARY OF DISCLOSURE

Technical Problem

In a fluoride ion battery, a cathode active material capable of being charged and discharged at a high potential has been demanded to increase the voltage of the battery. The present disclosure has been made in view of the above circumstances, and a main object thereof is to provide a cathode active material that is used in a fluoride ion battery and is capable of being charged and discharged at a high potential.

Solution to Problem

In order to achieve the object, the present disclosure provides a cathode active material used in a fluoride ion battery, the cathode active material comprising: a Ce element, a S element, and a F element; and a composition represented by CeSF.

According to the present disclosure, it has been found out that a compound having a specific composition can be used as a cathode active material in a fluoride ion battery, and can function as a cathode active material capable of being charged and discharged at a high potential.

Also, the present disclosure provides a cathode active material used in a fluoride ion battery, the cathode active material comprising: a Ce element, a S element, and a F element; and a crystal phase having a peak at a position of $2\theta=25.4°\pm0.5°$, $31.2°\pm0.5°$, $41.0°\pm0.5°$, $45.0°\pm0.5°$, and $52.6°\pm0.5°$ in an X-ray diffraction measurement using a CuKα ray.

According to the present disclosure, it has been found out that a compound having a specific crystal phase can be used as a cathode active material in a fluoride ion battery, and can function as a cathode active material capable of being charged and discharged at a high potential.

Also, the present disclosure provides a fluoride ion battery comprising: a cathode active material layer, an anode active material layer, and an electrolyte layer formed between the cathode active material layer and the anode active material layer; wherein the cathode active material layer contains the above described cathode active material.

According to the present disclosure, usage of the above described cathode active material allows a fluoride ion battery to have high battery voltage.

Advantageous Effects of Disclosure

The present disclosure exhibits effects that a cathode active material used in a fluoride ion battery and capable of being charged and discharged at a high potential can be provided.

DESCRIPTION OF EMBODIMENTS

Figure 1:
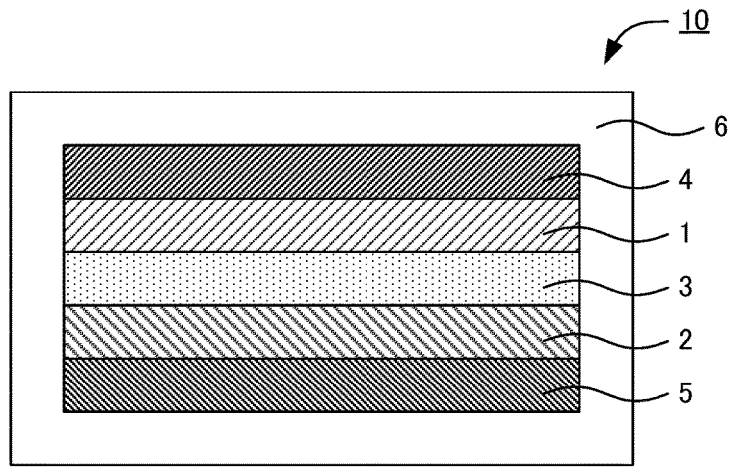
FIG. 1 is a schematic cross-sectional view illustrating an example of the fluoride ion battery of the present disclosure.

The cathode active material and the fluoride ion battery of the present disclosure are hereinafter explained in details.

A. Cathode Active Material

The cathode active material of the present disclosure is a cathode active material used in a fluoride ion battery. The cathode active material usually comprises at least a Ce element, a S element, and a F element. Also, the cathode active material preferably comprises a composition represented by CeSF. Also, the cathode active material preferably comprises a crystal phase having a peak at the specific position in an X-ray diffraction measurement.

Now, a fluoride ion battery has lower battery voltage compared to, for example, that of a Li ion battery. In specific, a Li ion battery may be a battery having approximately 5 V at the maximum. Compared thereto, a fluoride ion battery may be no more than a battery having approximately 3.1 V, for example, when a cathode is Cu (0.7 V vs. Pb/ $Pb^{2+}$) and an anode is $LaF_3$ (−2.4 V vs. $Pb/Pb^{2+}$). Also, when $CeF_3$ is used as a cathode active material replacing the Cu for example, the average charge and discharge potential of the $CeF_3$ is 1.0 V vs. $Pb/Pb^{2+}$, which shows higher potential than the potential of the Cu; however, as a battery, it may be no more than a battery having approximately 3.5 V. The battery voltage is a factor directly relating to the output and the energy density of the battery. Accordingly, a fluoride ion battery with higher battery voltage has been demanded.

One of the reasons why the battery voltage of a fluoride ion battery is low is that a cathode active material with a high potential has not been found.

To solve the problem, the inventor of the present disclosure has found out that a specific compound has functioned as a cathode active material capable of being charged and discharged at a high potential. The cathode active material of the present disclosure is capable of showing higher charge and discharge potential than, for example, $CeF_3$ utilizing the oxidization reduction reaction represented by $Ce^{3+} \leftrightarrow Ce^{4+}$, which results in enabling a fluoride ion battery to achieve high voltage. The reason for the cathode active material of the present disclosure showing high voltage is not clear, but presumed as follows. That is, in the present disclosure, the cathode active material comprises not only a Ce element but also a S element, so as to give somewhat influence to charge and discharge of the fluoride ion battery; as the result, the theoretical potential is presumably changed. Incidentally, the charge and discharge potential may be increased in the present disclosure; however, the change in the charge and discharge potential at this time is not due to overvoltage caused by the resistance inside the fluoride ion battery, but it can be said that the charge and discharge potential are theoretically changed; this is clear from the results of later described Example. In specific, usually, in the case of the voltage change due to overvoltage, when the charge potential increases (the resistance becomes high), the discharge potential tends to decrease. Meanwhile, when the charge potential decreases (the resistance becomes low), the discharge potential tends to increase. On the other hand, according to the results of the later described Example, in the fluoride ion battery using the cathode active material of the present disclosure, both of the charge potential and the discharge potential increased. Thus, in the fluoride ion battery using the cathode active material of the present disclosure, it can be said that the theoretical potential changes.

Also, according to the present disclosure, it has been found out that a specific compound has functioned as a cathode active material with high capacity. Accordingly, usage of the cathode active material of the present disclosure allows a fluoride ion battery to have high energy density.

The cathode active material of the present disclosure comprises at least a Ce element, a S element, and a F element. The cathode active material of the present disclosure may comprise just a Ce element, a S element, and a F element. Also, the cathode active material of the present disclosure may comprise an additional element to the above described elements to the extent that the desired effect can be obtained.

The cathode active material of the present disclosure preferably comprises a composition represented by CeSF. "The composition represented by CeSF" may be obtained by, for example, a reaction of $CeF_3$ and $Ce_2S_3$ in the molar ratio of 1:1 ($CeF_3 + Ce_2S_3 \rightarrow 3$ (CeSF)).

The cathode active material of the present disclosure preferably has crystallinity. The cathode active material of the present disclosure preferably comprises a crystal phase having a peak at a position of $2\theta = 25.4°\pm0.5°$, $31.2°\pm0.5°$, $41.0°\pm0.5°$, $45.0°\pm0.5°$, and $52.6°\pm0.5°$ in an X-ray diffraction measurement using a CuKα ray. The crystal phase of the cathode active material may further have a peak at the position of $2\theta = 65.9°\pm0.5°$, and $71.9°\pm0.5°$. Incidentally, the range of these peak positions may be $\pm0.3°$, and may be $\pm0.1°$. Also, the crystal phase comprises at least a Ce element, a S element, and a F element.

The cathode active material of the present disclosure preferably comprises the crystal phase having the peak as a main phase. The proportion of the crystal phase to all the crystal phases included in the cathode active material is, for example, 50 weight % or more, may be 70 weight % or more, and may be 90 weight % or more. Incidentally, the proportion of the crystal phase may be measured by, for example, radiation XRD.

There are no particular limitations on the shape of the cathode active material of the present disclosure, and examples thereof may include a granular shape. The average particle size ($D_{50}$) of the cathode active material is, for example, in a range of 0.1 μm to 50 μm, and preferably in a range of 1 μm to 20 μm. The average particle size ($D_{50}$) of the cathode active material may be measured by, for example, the result of a particle distribution measurement using a laser diffraction scattering method.

There are no particular limitations on the method to produce the cathode active material of the present disclosure as long as the method allows the intended cathode active material to be obtained, and examples thereof may include a mechanical milling method.

B. Fluoride Ion Battery

FIG. 1 is a schematic cross-sectional view illustrating an example of the fluoride ion battery of the present disclosure. Fluoride ion battery 10 illustrated in FIG. 1 comprises cathode active material layer 1 containing a cathode active material, anode active material layer 2 containing an anode active material, electrolyte layer 3 formed between cathode active material layer 1 and anode active material layer 2, cathode current collector 4 for collecting currents of cathode active material layer 1, anode current collector 5 for collecting currents of anode active material layer 2, and battery case 6 for storing these members. The present disclosure features a configuration that cathode active material layer 1 comprises the cathode active material described in "A. Cathode active material" above.

According to the present disclosure, usage of the above described cathode active material allows a fluoride ion battery to have high battery voltage. Also, according to the present disclosure, usage of the above described cathode active material allows a fluoride ion battery to have high energy density.

The fluoride ion battery of the present disclosure is hereinafter explained in each constitution.

1. Cathode active material layer

The cathode active material layer in the present disclosure is a layer containing at least a cathode active material. The cathode active material is in the same contents as those described in "A. Cathode active material" above. The content of the cathode active material in the cathode active material layer is, for example, 25 weight % or more, preferably 50 weight % or more, and more preferably 75 weight % or more.

The cathode active material layer may further contain at least one of a conductive material, a solid electrolyte, and a binder, other than the cathode active material. There are no particular limitations on the conductive material if it has the desired electron conductivity, and examples thereof may include a carbon material. Examples of the carbon material may include carbon black such as acetylene black, Ketjen black, furnace black, and thermal black; graphene, fullerene, carbon nanotube, and vapor grown carbon fiber (VGCF). The content of the conductive material in the cathode active material layer is, for example, 10 weight % or less, and may be 5 weight % or less.

There are no particular limitations on the binder if it is chemically and electronically stable, and examples thereof may include a fluorine-based binder such as polyvinylidene fluoride (PVDF) and polytetra fluoroethylene (PTFE). The content of the binder in the cathode active material layer is, for example, 10 weight % or less, and may be 5 weight % or less.

The solid electrolyte is in the same contents as those described in "3. Electrolyte layer" later; thus, the descriptions herein are omitted.

The cathode active material layer may further contain a substance such as a fluoride of Ce and a sulfide of Ce. Examples of the fluoride of Ce may include $CeF_3$. Also, examples of the sulfide of Ce may include $Ce_2S_3$.

The thickness of the cathode active material layer varies greatly with the constitutions of the batteries, and thus there is no particular limitation.

2. Anode Active Material Layer

The anode active material layer in the present disclosure is a layer containing at least an anode active material. Also, the anode active material layer may further contain at least one of a conductive material, a solid electrolyte, and a binder, other than the anode active material.

As the anode active material, an arbitrary active material having a lower potential than that of the cathode active material may be selected. Examples of the anode active material may include a simple substance of metal, an alloy, a metal oxide, and fluoride of these. The metal element to be included in the anode active material may be, for example, La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among them, the anode active material is preferably Mg, $MgF_x$, Al, $AlF_x$, Ce, $CeF_x$, Ca, $CaF_x$, Pb, and $PbF_x$. Incidentally, the x is a real number larger than 0.

As the conductive material and the binder, the same materials as those described in "1. Cathode active material layer" above may be used. The solid electrolyte is in the same contents as those described in "3. Electrolyte layer" later; thus, the descriptions herein are omitted.

The content of the anode active material in the anode active material layer is preferably larger from the viewpoint of the capacity. For example, the content is 30 weight % or more, preferably 50 weight % or more, and more preferably 70 weight % or more. Also, the thickness of the anode active material layer varies greatly with the constitutions of the batteries, and thus there are no particular limitations.

3. Electrolyte Layer

The electrolyte layer in the present disclosure is a layer formed between the cathode active material layer and the anode active material layer. The electrolyte to be included in the electrolyte layer may be an electrolyte solution (a liquid electrolyte), and may be a solid electrolyte. In other words, the electrolyte layer may be a liquid electrolyte layer, and may be a solid electrolyte layer; however, the latter is preferable.

The liquid electrolyte in the present disclosure contains a fluoride salt and an organic solvent for example. Examples of the fluoride salt may include an inorganic fluoride salt, an organic fluoride salt, and an ionic solution. An example of the inorganic fluoride salt may be XF (X is Li, Na, K, Rb, or Cs). An example of the cation of the organic fluoride salt may be an alkyl ammonium cation such as tetramethyl ammonium cation. The concentration of the fluoride salt in the liquid electrolyte is, for example, in a range of 0.1 mol % to 40 mol %, and preferably in a range of 1 mol % to 10 mol %.

The organic solvent of the liquid electrolyte is usually a solvent that dissolves the fluoride salt. Examples of the organic solvent may include glyme such as triethylene glycol dimethyl ether (G3) and tetraethylene glycol dimethyl ether (G4); a cyclic carbonate such as ethylene carbonate (EC), fluoroethylene carbonate (FEC), difluoroethylene carbonate (DFEC), propylene carbonate (PC), and butylene carbonate (BC); and a chain carbonate such as dimethyl carbonate (DMC), diethyl carbonate (DEC), and ethyl methyl carbonate (EMC). Also, an ionic solution may be used as the organic solvent.

On the other hand, examples of the solid electrolyte may include an inorganic solid electrolyte. Examples of the inorganic solid electrolyte may include a fluoride containing a lanthanoid element such as La and Ce, a fluoride containing an alkali element such as Li, Na, K, Rb, and Cs, and a fluoride containing an alkali earth element such as Ca, Sr, and Ba. Specific examples of the inorganic solid electrolyte may include a fluoride containing La and Ba, a fluoride containing Pb and Sn, and a fluoride containing Bi and Sn.

Also, the thickness of the electrolyte layer in the present disclosure varies greatly with the constitutions of the batteries, and thus there are no particular limitations.

4. Other Constitutions

The fluoride ion battery of the present disclosure comprises at least the above described anode active material layer, cathode active material layer, and electrolyte layer, and usually further comprises a cathode current collector for collecting currents of the cathode active material layer, and an anode current collector for collecting currents of the anode active material layer. Examples of the shape of the current collector may include a foil shape, a mesh shape, and a porous shape. Also, the fluoride ion battery of the present disclosure may include a separator between the cathode active material layer and the anode active material layer. The reason therefor is to obtain a battery with higher safety.

5. Fluoride Ion Battery

The fluoride ion battery of the present disclosure may be a primary battery and may be a secondary battery, but is preferably a secondary battery among them, so as to be repeatedly charged and discharged, and useful as a car-mounted battery for example. Incidentally, the secondary battery includes the usage of the secondary battery as a primary battery (for the purpose just to discharge once after charge). Also, examples of the shape of the fluoride ion battery of the present disclosure may include a coin shape, a laminate shape, a cylindrical shape, and a square shape.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is described in further details.

Example

Synthesis of Cathode Active Material $CeF_3$ and $Ce_2S_3$ were weighed so as to be $CeF_3$:$Ce_2S_3$=1:1 in the molar ratio, and mechanical milling thereto was conducted by a ball mill in the conditions of 600 rpm and for 3 hours to obtain a cathode active material (CeSF).

Fabrication of Cathode Mixture

As a solid electrolyte, $La_{0.9}Ba_{0.1}F_{2.9}$ (LBF) was prepared, and as a conductive material, VGCF was prepared. The cathode active material, the solid electrolyte, and the conductive material were weighed so as to be cathode active material:solid electrolyte:conductive material=30:60:10 in the weight ratio, and mixed by a ball mill at 100 rpm for 10 hours to obtain a cathode mixture.

Fabrication of Evaluation Battery

Figure 2A:
FIGS. 2A and 2B are schematic cross-sectional views exemplifying the evaluation batteries fabricated in Example and Comparative Example.

A stacked body of the above described cathode mixture and a platinum foil as a material for a working electrode, $La_{0.9}Ba_{0.1}F_{2.9}$ (LBF) as a material for a solid electrolyte layer, and a stacked body of $Pb_{0.6}Sn_{0.04}F_2$ (PSF) and a Pb foil as a material for a counter electrode were used. The cathode mixture, the LBF, the stacked body of the PSF and the Pb foil were pressure-powder-molded to obtain an evaluation battery shown in FIG. 2A.

Comparative Example

Figure 2B:
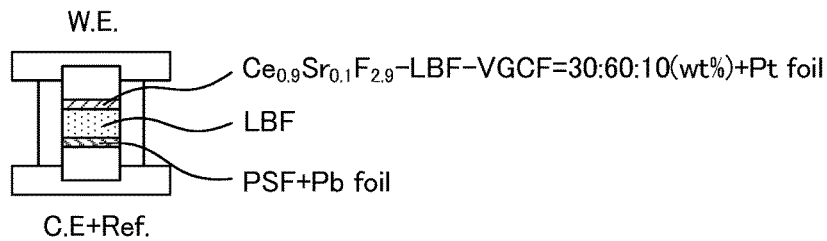

An evaluation battery as shown in FIG. 2B was fabricated in the same manner as in Example except that $Ce_{0.9}Sr_{0.1}F_{2.9}$ was used as the cathode active material.

Incidentally, $Ce_{0.9}Sr_{0.1}F_{2.9}$ was fabricated in the following procedures.

$CeF_3$ and $SrF_2$ were mixed by a mortar so as to be $CeF_3:SrF_2=9:1$ in the molar ratio, and after that, a heat treatment at 900° C. was conducted to the mixture in an Ar atmosphere for 10 hours to obtain $Ce_{0.9}Sr_{0.1}F_{2.9}$. Incidentally, the reason for using $Ce_{0.9}Sr_{0.1}F_{2.9}$ instead of $CeF_3$ in Comparative Example is that the charge and discharge reactions may be easily confirmed in $Ce_{0.9}Sr_{0.1}F_{2.9}$, in which $SrF_2$ is dissolved in $CeF_3$, since the ion conductivity thereof is higher than that of $CeF_3$. The $Ce_{0.9}Sr_{0.1}F_{2.9}$ has a Tysonite structure. Also, it is presumed that the oxidization reduction reaction represented by $Ce^{3+} \leftrightarrow Ce^{4+}$ occurs in the charge and discharge reaction of $Ce_{0.9}Sr_{0.1}F_{2.9}$.

CV Measurement and Charge and Discharge Test

A charge and discharge test in a cell heated at 140° C. was conducted for the evaluation batteries obtained in Example and Comparative Example. Current conditions were 30 $\mu A/cm^2$ (charge) and 30 $\mu A/cm^2$ (discharge). The results are shown in FIG. 3 and FIG. 4.

Figure 3:
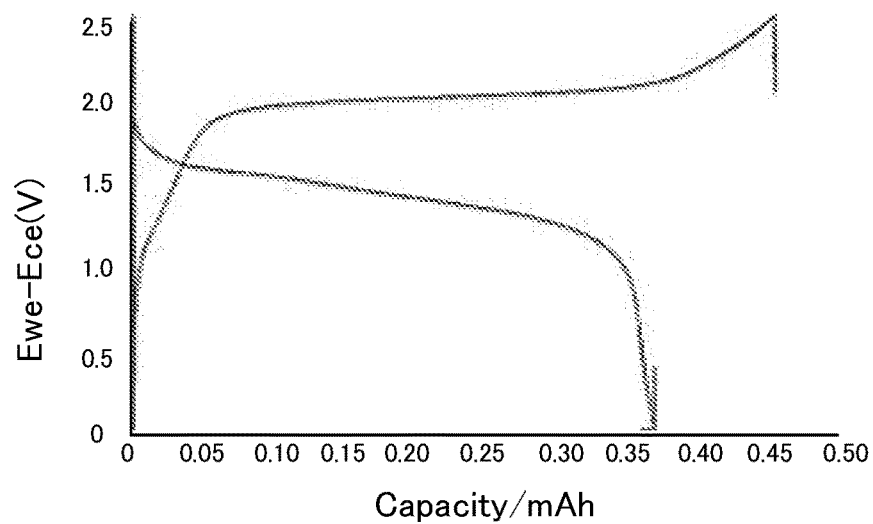
FIG. 3 is the result of a charge and discharge test for the evaluation battery obtained in Example.

As shown in FIG. 3, it was confirmed that the cathode active material obtained in Example showed the charge and discharge reactions at a high potential as a cathode active material in a fluoride ion battery. In Example, the fluoridation and defluoridation presumably proceeded utilizing the oxidization reduction reaction represented by $Ce^{3+} \leftrightarrow Ce^{4+}$ and the oxidization reduction reaction of S.

Figure 4:
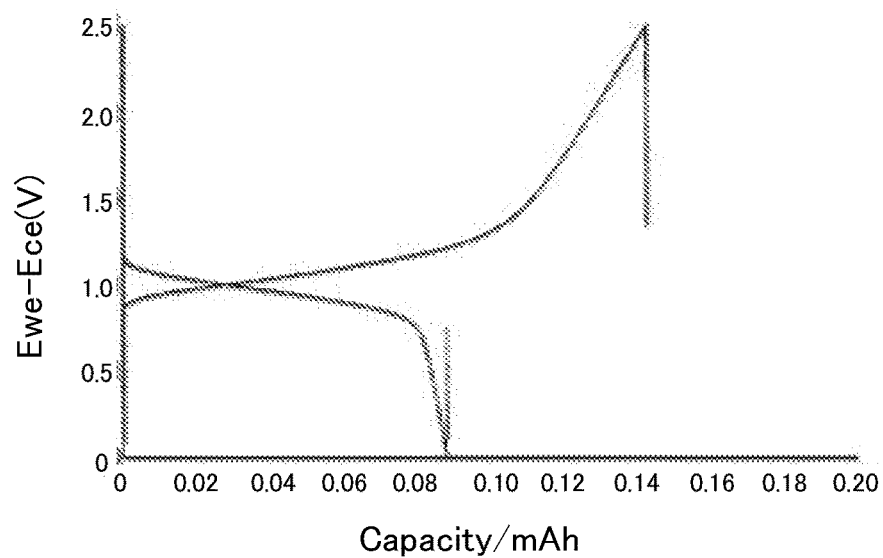
FIG. 4 is the result of a charge and discharge test for the evaluation battery obtained in Comparative Example.

AS shown in FIG. 3 and FIG. 4, it was confirmed that both the charge potential and the discharge potential in Example showed higher potentials than those in Comparative Example. In specific, while the average charge and discharge voltage of the reaction in Comparative Example ($Ce_{0.9}Sr_{0.1}F_{2.9}$) was 1.0 V (vs. $Pb/Pb^{2+}$), the average charge and discharge voltage of the reaction in Example (CeSF) was 1.7 V (vs. $Pb/Pb^{2+}$); it was confirmed that the charge and discharge reactions proceeded in high potentials in Example.

Also, it was confirmed that both the charge potential and the discharge potential increased in Example.

Usually, in the case of the voltage change due to overvoltage, when the charge potential increases (when the resistance becomes high), the discharge potential tends to decrease. Meanwhile, when the charge potential decreases (when the resistance becomes low), the discharge potential tends to increase. On the other hand, according to the above described result of Example, in the fluoride ion battery using the cathode active material of the present disclosure, both the charge potential and the discharge potential increased; however, these tendencies were not confirmed in Example. Thereby, it was confirmed that the potential did not change because of overvoltage due to the resistance inside the battery, but the charge and discharge potentials theoretically changed.

The reason for the change in the theoretical potential is presumed that not only Ce but also S gave somewhat influence to the charge and discharge potential.

XRD Measurement

Figure 5:
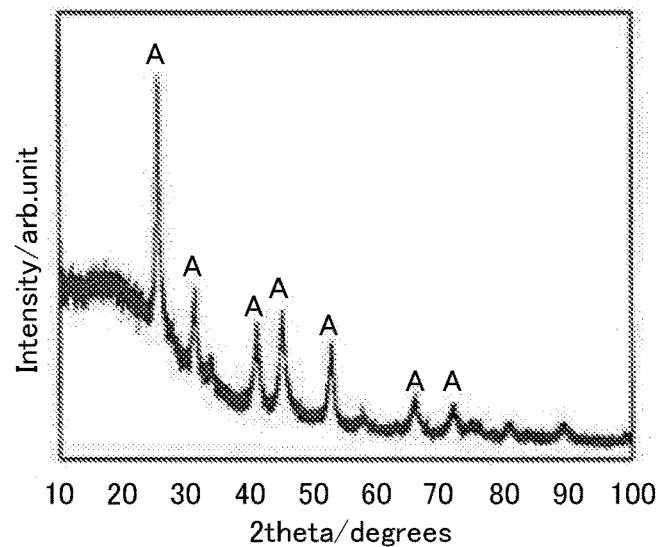
FIG. 5 is the result of an XRD measurement for the cathode active material (CeSF) fabricated in Example.
Figure 6:
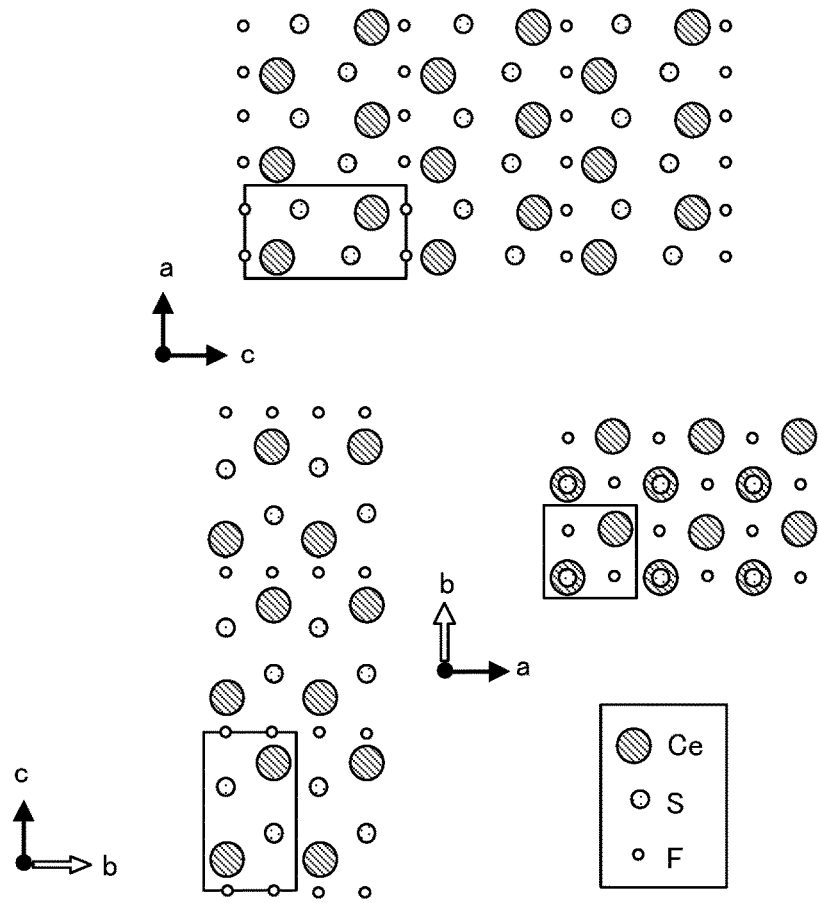
FIG. 6 is a schematic diagram showing the crystal structure of a CeSF.

An X-ray diffraction measurement (XRD measurement) was conducted to the cathode active material (CeSF) fabricated in Example. Incidentally, a CuKα ray was used as the source of radiation. The result is shown in FIG. 5. As shown in FIG. 5, it was confirmed that the cathode active material (CeSF) fabricated in Example was a material with a single phase. The peaks of 2θ=25.4°, 31.2°, 41.0°, 45.0°, 52.6°, 65.9°, and 71.9° were confirmed as the characteristic peaks of CeSF. These peaks correspond to the peaks shown as A in FIG. 5. Also, the crystal structure of CeSF is shown in FIG. 6.

REFERENCE SIGNS LIST

1 . . . cathode active material layer
2 . . . anode active material layer
3 . . . electrolyte layer
4 . . . cathode current collector
5 . . . anode current collector
6 . . . battery case
10 . . . fluoride ion battery

The invention claimed is:

1. A cathode active material used in a fluoride ion battery, the cathode active material comprising:
a Ce element, a S element, and a F element; and
a composition represented by CeSF.

2. A cathode active material used in a fluoride ion battery, the cathode active material comprising:
a Ce element, a S element, and a F element; and
a crystal phase having a peak at a position of 2θ=25.4°±0.5°, 31.2°±0.5°, 41.0°±0.5°, 45.0°±0.5°, and 52.6°±0.5° in an X-ray diffraction measurement using a CuKα ray.

3. A fluoride ion battery comprising:
a cathode active material layer, an anode active material layer, and an electrolyte layer formed between the cathode active material layer and the anode active material layer;
wherein the cathode active material layer contains the cathode active material according to claim 1.

4. A fluoride ion battery comprising:
a cathode active material layer, an anode active material layer, and an electrolyte layer formed between the cathode active material layer and the anode active material layer;
wherein the cathode active material layer contains the cathode active material according to claim 2.

* * * * *

UNITED STATES PATENT AND TRADEMARK OFFICE
CERTIFICATE OF CORRECTION

| | | |
|---|---|---|
| PATENT NO. | : 10,483,530 B2 | |
| APPLICATION NO. | : 16/157778 | |
| DATED | : November 19, 2019 | |
| INVENTOR(S) | : Hidenori Miki | |

It is certified that error appears in the above-identified patent and that said Letters Patent is hereby corrected as shown below:

On the Title Page

Below (22) insert:
--(30)   Foreign Application Priority Data
Oct. 20, 2017   (JP)     2017203284--

Signed and Sealed this
Eighteenth Day of February, 2020

Andrei Iancu
*Director of the United States Patent and Trademark Office*